United States Patent
Anders et al.

(10) Patent No.: US 10,079,792 B2
(45) Date of Patent: Sep. 18, 2018

(54) RECOMMENDING HASHTAGS TO BE USED IN COMPOSED MESSAGE TO INCREASE PROPAGATION SPEED AND ENHANCE DESIRED SENTIMENT OF COMPOSED MESSAGE

(71) Applicant: International Business Machines Corporation, Armonk, NY (US)

(72) Inventors: Kelley L. Anders, East New Market, MD (US); Trudy L. Hewitt, Cary, NC (US); Alireza Pourshahid, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 14/656,934

(22) Filed: Mar. 13, 2015

(65) Prior Publication Data
US 2016/0269344 A1    Sep. 15, 2016

(51) Int. Cl.
*H04L 12/58*    (2006.01)
*G06F 17/27*    (2006.01)

(52) U.S. Cl.
CPC .......... *H04L 51/32* (2013.01); *G06F 17/2705* (2013.01)

(58) Field of Classification Search
None
See application file for complete search history.

(56) References Cited

U.S. PATENT DOCUMENTS

| | | | |
|---|---|---|---|
| 8,312,056 B1 * | 11/2012 | Peng | G06Q 50/01 705/319 |
| 2012/0131139 A1 * | 5/2012 | Siripurapu | G06F 17/30864 709/217 |

(Continued)

FOREIGN PATENT DOCUMENTS

WO    2013155529 A1    10/2013

OTHER PUBLICATIONS

Anonymously, "System and Method for Recommending Social Media Hashtags," IP.com, IP.com No. 000222352, Sep. 26, 2012, pp. 1-3.

(Continued)

*Primary Examiner* — Nicholas R Taylor
*Assistant Examiner* — Christopher B Robinson
(74) *Attorney, Agent, or Firm* — Robert A. Voigt, Jr.; Winstead, P.C.

(57) ABSTRACT

A method, system and computer program product for assisting a user in selecting a desired hashtag. The text of a message that is composed by a user is parsed to determine the topic of interest, the sentiment of the message and the target audience. The historical and current communications for the target audience are evaluated to identify hashtags that are trending on the topic of the composed message. Furthermore, the historical and current communications for the target audience are evaluated to identify hashtags that match the desired sentiment of the composed message. The propagation speeds of the identified hashtags will then be identified. A recommended hashtag is then generated to be popu- (Continued)

lated in the composed message that will increase a propagation speed of the composed message and/or emphasize the sentiment of the composed message based on these evaluations and the propagation speeds of the hashtags.

18 Claims, 5 Drawing Sheets

(56) References Cited

U.S. PATENT DOCUMENTS

| | | | |
|---|---|---|---|
| 2013/0018957 A1* | 1/2013 | Parnaby | G06Q 10/10 709/204 |
| 2013/0254231 A1 | 9/2013 | Decker et al. | |
| 2013/0282834 A1* | 10/2013 | Dempski | G06Q 30/0201 709/206 |
| 2013/0298084 A1* | 11/2013 | Spivack | H04L 65/403 715/854 |
| 2013/0304818 A1 | 11/2013 | Brumleve et al. | |
| 2013/0332162 A1 | 12/2013 | Keen | |

OTHER PUBLICATIONS

Anonymously, "A Method of Suggesting Hashtags for a Tweet Based on its Time, Content and Author," IP.com, IP.com Number: 000234626, Jan. 23, 2014, pp. 1-3.

Jaschke et al., "Tag Recommendations in Social Bookmarking Systems," AI Communications, vol. 21, No. 4, 2008, pp. 231-247.

Song et al., "Automatic Tag Recommendation Algorithms for Social Recommender Systems," ACM Transactions on Computational Logic, Sep. 2008, pp. 1-35.

* cited by examiner

RECOMMENDING HASHTAGS TO BE USED IN COMPOSED MESSAGE TO INCREASE PROPAGATION SPEED AND ENHANCE DESIRED SENTIMENT OF COMPOSED MESSAGE

TECHNICAL FIELD

The present invention relates generally to social network services, and more particularly to recommending hashtags to be used in a composed message to increase the propagation speed and enhance the desired sentiment of the composed message.

BACKGROUND

A social network service is an online service, platform or site that focuses on building social networks or social relations among people (e.g., those who share interests and/or activities). A social network service essentially consists of a representation of each user (often a profile), his/her social links, and a variety of additional services. Most social network services are web-based and provide means for users to interact over the Internet, such as by e-mail and instant messaging. Social networking sites allow users to share ideas, activities, events, and interests within their individual networks.

Oftentimes, in social media posts, the user (e.g., individual, corporation) includes a hashtag with the message posted on the social networking site. A hashtag is a word or an unspaced phrase prefixed with the hash character (or number sign), #, to form a label. It is a type of metadata tag. Words or phrases in messages on microblogging and social networking services, such as Facebook®, Google+®, Instagram® and Twitter®, may be tagged by entering # before them, either as they appear in a sentence, e.g., "New artists announced for #SXSW2014 Music Festival" or appended to it.

Users attempt to use the best hashtag to reach the target audience as well as to increase the speed of propagation for the message (i.e., share the message with the largest number of people in the shortest amount of time). If the user selects the wrong hashtag, the message may not be shared with as many people as desired (i.e., the propagation speed of the message may be less than desired). Furthermore, if the user selects the wrong hashtag, the message may be grouped with people discussing the message negatively which may not be the intention of the user composing the message. For example, if a company is attempting to promote a new product in their message, it would be desirable to utilize a hashtag that is aligned with other posts that have a shared sentiment (attitude, manifestation or emotional feeling of the thought expressed in the message) that will help support the message they are relaying. However, if they choose the wrong hashtag, the post may be grouped with people discussing negative experiences thereby reducing the desired impact of the message.

Currently, there is no means for assisting the user in selecting a hashtag that enhances the desired sentiment of the message as well as increase the speed of propagation for the message.

BRIEF SUMMARY

In one embodiment of the present invention, a method for assisting a user in selecting a desired hashtag comprises parsing text of a composed message to determine a topic of interest, a sentiment and a target audience. The method further comprises evaluating historical and current communications for the target audience who will be receiving the composed message to identify hashtags that are trending on the topic of the composed message and/or related topics to the topic of the composed message. The method additionally comprises evaluating historical and current communications for the target audience who will be receiving the composed message to identify hashtags that match the sentiment of the composed message. Furthermore, the method comprises determining propagation speeds of the identified hashtags. Additionally, the method comprises generating, by a processor, a recommended hashtag to be populated in the composed message that will increase a propagation speed of the composed message and/or emphasize the sentiment of the composed message based on identifying the hashtags that are trending on the topic of the composed message and/or related topics to the topic of the composed message, identifying the hashtags that match the sentiment of the composed message and determining the propagating speeds of the identified hashtags. In addition, the method comprises populating the composed message with the recommended hashtag that will increase the propagation speed of the composed message and/or emphasize the sentiment of the composed message.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for assisting a user in selecting a desired hashtag. In one embodiment of the present invention, the text of a message (e.g., e-mail message, instant message, SMS message, social media post) that is composed by a user is parsed to determine the topic of interest, the sentiment of the message and the target audience. The historical and current communications for the target audience (as well as their extended network) who will be receiving the composed message are evaluated to identify hashtags that are trending on the topic of the composed message and/or related topics to the topic of the composed message. Hashtags can be identified that are trending on the topic of the composed message and/or related to the topic of the composed message using a mapping of the hashtags to various topics as well as using the hashtag trends stored in a database. For example, if the topic identified in the composed message was the injury to Victor Martinez and the target audience was fans of the Detroit Tigers® baseball team, then based on the hashtags trending on the topic (and/or related to the topic) of the injury to Victor Martinez for such a target audience, the hashtags of "#VictorMartinez," "#DetroitTigersInjury," and "#DetroitTigers" may be identified based on the mapping of the hashtags of "#VictorMartinez," "#DetroitTigersInjury," and "#DetroitTigers" to various posts related to the injury to the Detroit Tigers® baseball player Victor Martinez stored in the database which have all been trending to be used as opposed to other hashtags (e.g., "#MartinezInjury") relating to the topic of Victor Martinez's injury. Furthermore, the historical and current communications for the target audience (as well as their extended network) who will be receiving the composed message are evaluated to identify hashtags that match the desired sentiment of the composed message. For example, the sentiment of the composed message of "Martinez tore the medial meniscus in his left knee last week during his off-season workout program. The Tigers' designated hitter will have to undergo surgery on his left knee. Let's hope the surgery will go smoothly and he will recover quickly!" may be identified as being one of concern based on keywords, such as "surgery," "hope," and "recover" using natural language processing. Hashtags will then be identified that match such a sentiment from a database storing a mapping of hashtags with sentiments. The propagation speeds of the identified hashtags will then be identified, such as from a database that stores the propagation speeds of hashtags being used. A recommended hashtag is then generated to be populated in the composed message that will increase a propagation speed of the composed message and/or emphasize the sentiment of the composed message based on these evaluations and the propagation speeds of the hashtags. The composed message is then populated with the recommended hashtag. In this manner, a hashtag may be selected for the author of the composed message that enhances the desired sentiment of the composed message as well as increase the speed of propagation for the message.

While the following discusses the present invention in connection with assisting a user in selecting a desired hashtag that enhances the desired sentiment of the message as well as increase the speed of propagation for the message, the principles of the present invention may be utilized with other methods that enable users to aggregate social topics/communications. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
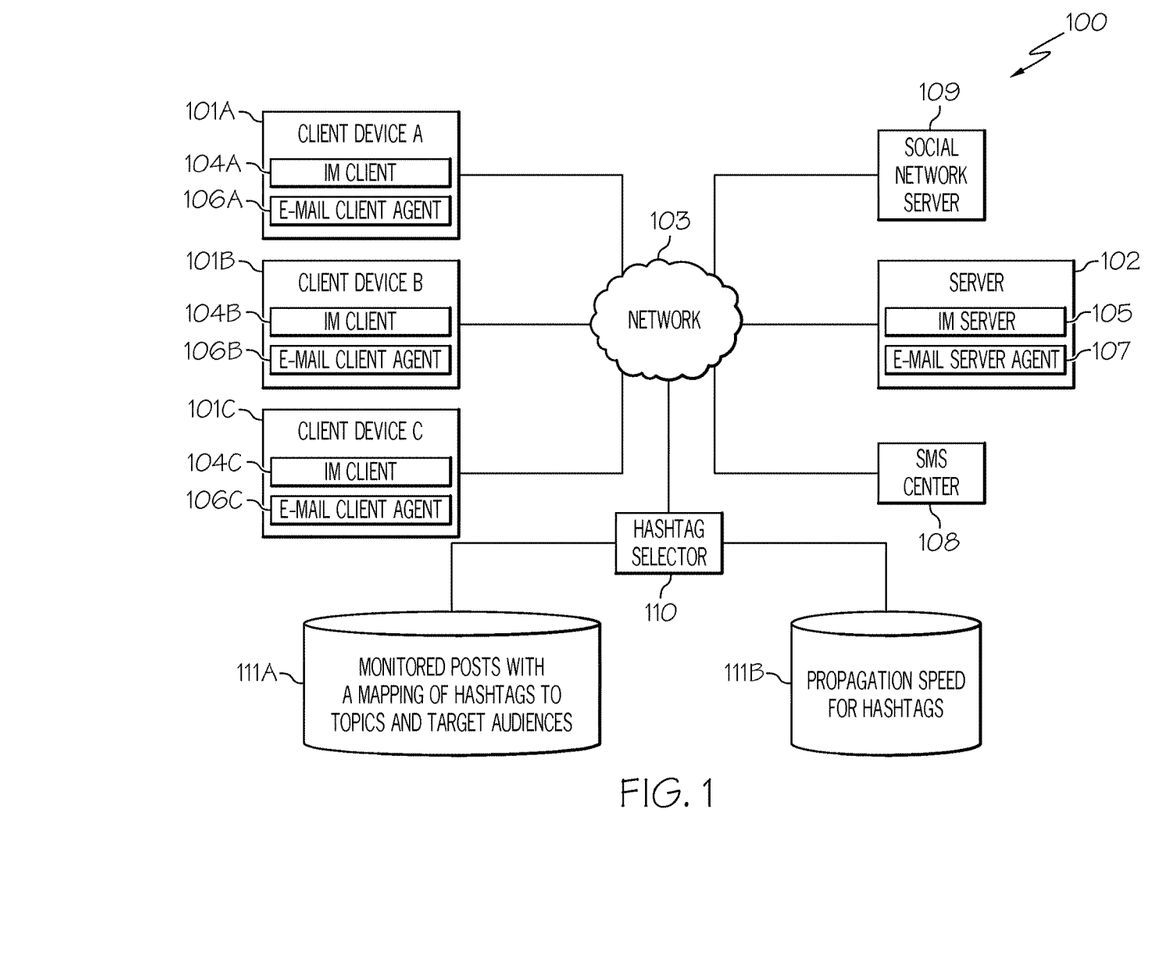
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes client devices 101A-101C (identified as "Client Device A," "Client Device B," and "Client Device C," respectively, in FIG. 1) connected to a server 102 via a network 103. Client devices 101A-101C may collectively or individually be referred to as client devices 101 or client device 101, respectively. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other client devices 101 and server 102. Client device 101 may be configured to send and receive text-based messages in real-time during an instant messaging session. Any user of client device 101 may be the creator or initiator of an instant message (message in instant messaging) and any user of client device 101 may be a recipient of an instant message. Furthermore, any user of client device 101 may be able to create, receive and send e-mails. Additionally, any user of client device 101 may be able to send and receive text messages, such as Short Message Services (SMS) messages. The term "messages," as used herein, encompasses each of these types of messages as well as posts to social media websites, such as Facebook®, forums, wikis, etc.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, client devices 101A-101C include a software agent, referred to herein as an Instant Messaging (IM) client 104A-104C, respectively. Instant messaging clients 104A-104C may collectively or individually be referred to as instant messaging clients 104 or instant messaging client 104, respectively. Furthermore, server 102 includes a software agent, referred to herein as the Instant Messaging (IM) server 105. IM client 104 provides the functionality to send and receive instant messages. As messages are received, IM client 104 presents the messages to the user in a dialog window (or IM window). Furthermore, IM client 104 provides the functionality for client device 101 to connect to the IM server 105 which provides the functionality of distributing the instant messages to the IM clients 104 associated with each of the sharing users.

Client devices 101A-101C may further include a software agent, referred to herein as an e-mail client agent 106A-106C, respectively. E-mail client agents 106A-106C may collectively or individually be referred to as e-mail client agents 106 or e-mail client agent 106, respectively. Furthermore, server 102 may include a software agent, referred to herein as the e-mail server agent 107. E-mail client agent 106 enables the user of client device 101 to create, send and receive e-mails. E-mail server agent 107 is configured to receive e-mail messages from client devices 101 and distribute the received e-mail messages among the one or more client devices 101.

While the preceding discusses each client device 101 as including an IM client 104 and an e-mail client agent 106, each client device 101 may not necessarily include each of these software agents. For example, some client devices 101 may only include an IM client 105; whereas, other client devices 101 may only include an e-mail client agent 106. In other words, each client device 101 may be able to perform some or all of the functions discussed herein, such as sending/receiving e-mails, sending/receiving instant messages, sending/receiving text messages, etc. Furthermore, while the preceding discusses a single server 102 including the software agents, such as IM server 105 and e-mail server agent 107, multiple servers may be used to implement these services. Furthermore, each server 102 may not necessarily be configured to include all of these software agents, but only a subset of these software agents. For example, one particular server 102 may only include IM server 105; whereas, another particular server 102 may only include e-mail server agent 107.

System 100 further includes a Short Message Service (SMC) center 108 configured to relay, store and forward text messages, such as SMS messages, among client devices 101 through network 103.

System 100 further includes a social network server 109, which may be a web server configured to offer a social networking and/or microblogging service, enabling users of client devices 101 to send and read other users' posts. "Posts," as used herein, include any one or more of the following: text (e.g., comments, sub-comments and replies), audio, video images, etc. Social network server 109 is connected to network 103 by wire or wirelessly. While FIG. 1 illustrates a single social network server 109, it is noted for clarity that multiple servers may be used to implement the social networking and/or microblogging service.

System 100 further includes a component, referred to herein as the "hashtag selector" 110, connected to network 103 by wire or wirelessly. Hashtag selector 110 is configured to select a hashtag that enhances the desired sentiment of a message being composed by a user of client device 101 as well as increase the speed of propagation for the composed message as discussed further below. A "hashtag," as used herein, refers to a word or an unspaced phrase prefixed with the hash character (or number sign), #, that forms a label. It is a type of metadata tag. Words or phrases in messages on microblogging and social networking services, such as Facebook®, Google+®, Instagram® and Twitter®, may be tagged by entering # before them, either as they appear in a sentence, e.g., "New artists announced for #SXSW2014 Music Festival" or appended to it.

In one embodiment, hashtag selector 110 utilizes information stored in databases 111A-111B to select such a hashtag as discussed further below. Databases 111A-111B may collectively or individually be referred to as databases 111 or database 111, respectively. Database 111A may be configured to store monitored posts with a mapping of hashtags used in the monitored posts to various topics (topics of the posts) and target audiences (audience to receive posts). Database 111B may be configured to store the propagation speed for the hashtags used in the historical posts (monitored posts). While FIG. 1 illustrates two separate databases 111A, 111B storing the information discussed above, such information may be stored in a single database or in more than two databases. A description of the hardware configuration of hashtag selector 110 is provided below in connection with FIG. 2.

System 100 is not to be limited in scope to any one particular network architecture. System 100 may include any number of client devices 101, servers 102, networks 103, SMS centers 108, social network servers 109, hashtag selectors 110 and databases 111. Furthermore, in one embodiment, hashtag selector 110 may be part of client device 101.

Figure 2:
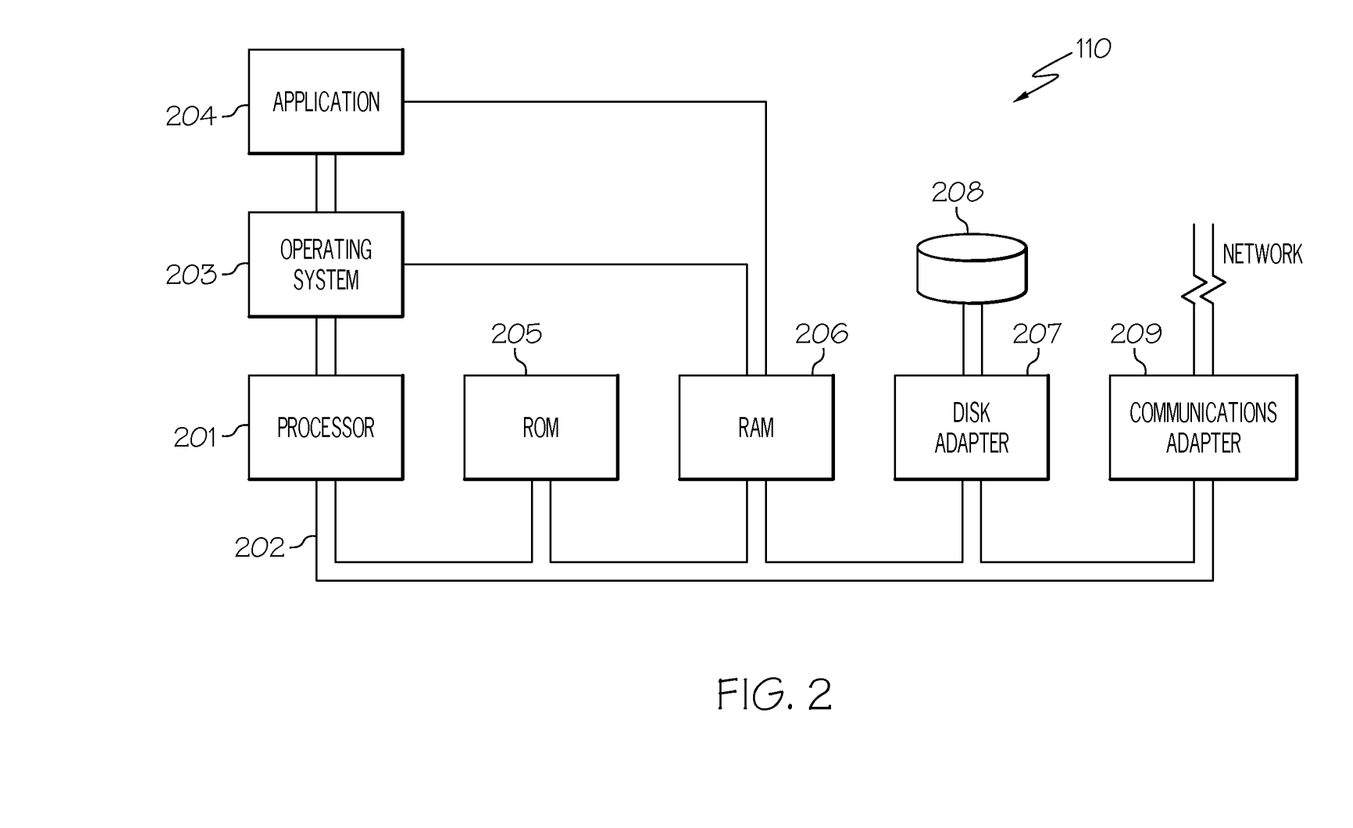
FIG. 2 illustrates a hardware configuration of a hashtag selector configured in accordance with an embodiment of the present invention.

Referring now to FIG. 2, FIG. 2 illustrates a hardware configuration of a hashtag selector 110 (FIG. 1) which is representative of a hardware environment for practicing the present invention. Referring to FIG. 2, hashtag selector 110 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for selecting a hashtag that enhances the desired sentiment of a message being composed by a user of client device 101 (FIG. 1) as well as increase the speed of propagation for the composed message as discussed further below in association with FIGS. 3-5.

Referring again to FIG. 2, read-only memory ("ROM") 205 is coupled to system bus 202 and includes a basic input/output system ("BIOS") that controls certain basic functions of hashtag selector 110. Random access memory ("RAM") 206 and disk adapter 207 are also coupled to system bus 202. It should be noted that software components including operating system 203 and application 204 may be loaded into RAM 206, which may be hashtag selector's 110 main memory for execution. Disk adapter 207 may be an integrated drive electronics ("IDE") adapter that communicates with a disk unit 208, e.g., disk drive. It is noted that the program for selecting a hashtag that enhances the desired sentiment of a message being composed by a user of client device 101 as well as increase the speed of propagation for the composed message, as discussed further below in association with FIGS. 3-5, may reside in disk unit 208 or in application 204.

Hashtag selector 110 may further include a communications adapter 209 coupled to bus 202. Communications adapter 209 interconnects bus 202 with an outside network (e.g., network 103 of FIG. 1) thereby allowing hashtag selector 110 to communicate with client devices 101, server 102, SMS center 108 and social network server 109.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, users attempt to use the best hashtag to reach the target audience as well as to increase the speed of propagation for the message (i.e., share the message with the largest number of people in the shortest amount of time). If the user selects the wrong hashtag, the message may not be shared with as many people as desired (i.e., the propagation speed of the message may be less than desired). Furthermore, if the user selects the wrong hashtag, the message may be grouped with people discussing the message negatively which may not be the intention of the user composing the message. For example, if a company is attempting to promote a new product in their message, it would be desirable to utilize a hashtag that is aligned with other posts that have a shared sentiment (attitude, manifestation or emotional feeling of the thought expressed in the message) that will help support the message they are relaying. However, if they choose the wrong hashtag, the post may be grouped with people discussing negative experiences thereby reducing the desired impact of the message. Currently, there is no means for assisting the user in selecting a hashtag that enhances the desired sentiment of the message as well as increase the speed of propagation for the message.

Figure 3:
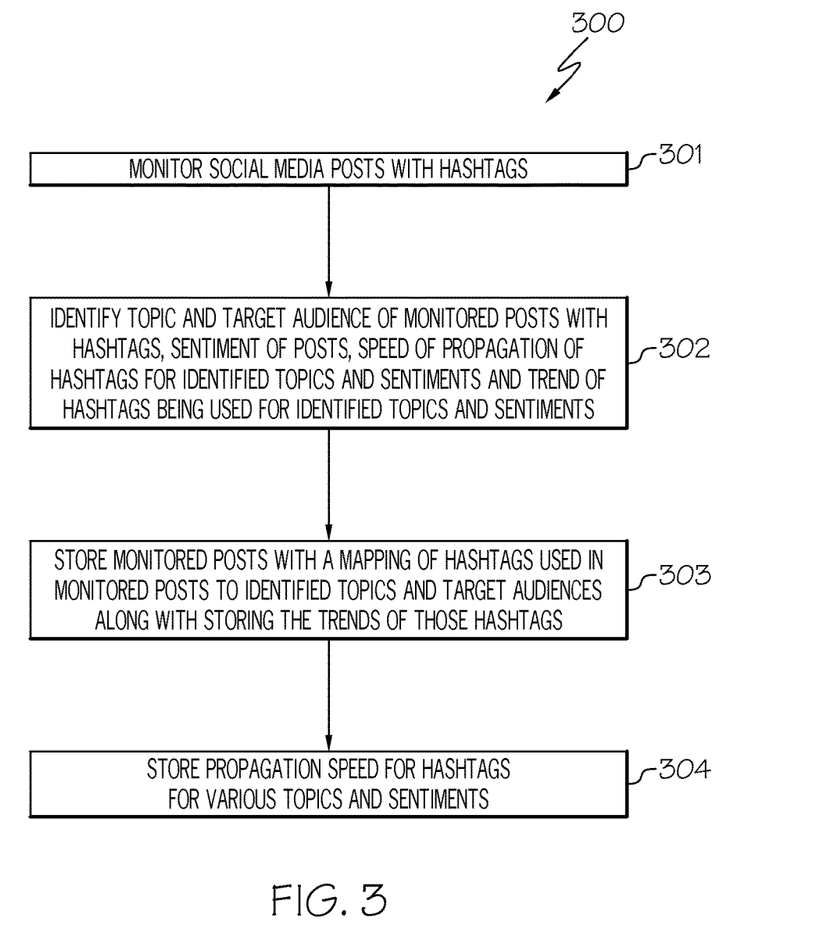
FIG. 3 is a flowchart of a method for populating databases with information used by the hashtag selector to select a hashtag that enhances the desired sentiment of a composed message as well as increase the speed of propagation for the message.
Figure 4:
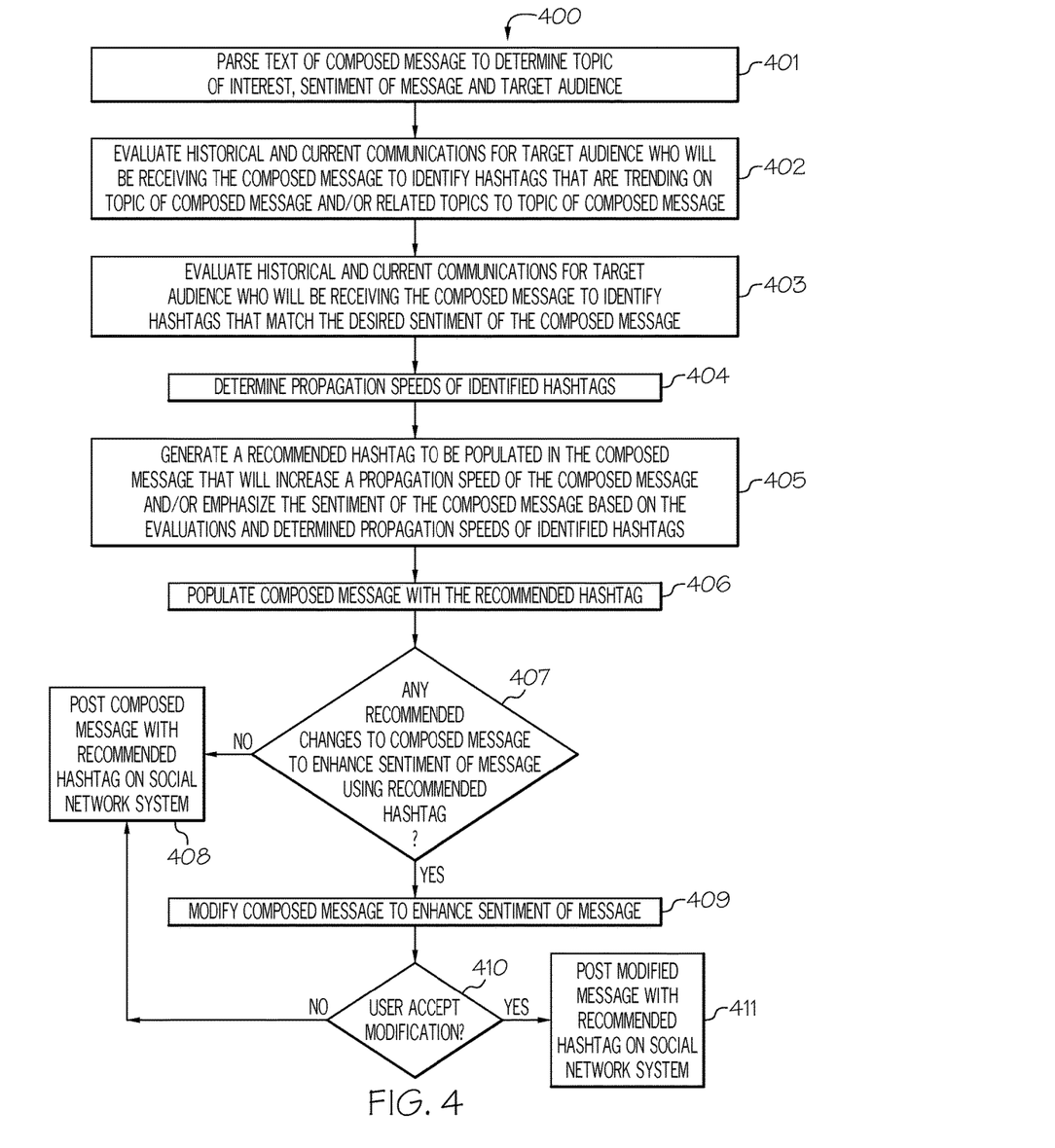
FIG. 4 is a flowchart of a method for selecting a hashtag that enhances the desired sentiment of a composed message as well as increase the speed of propagation for the message.
Figure 5:
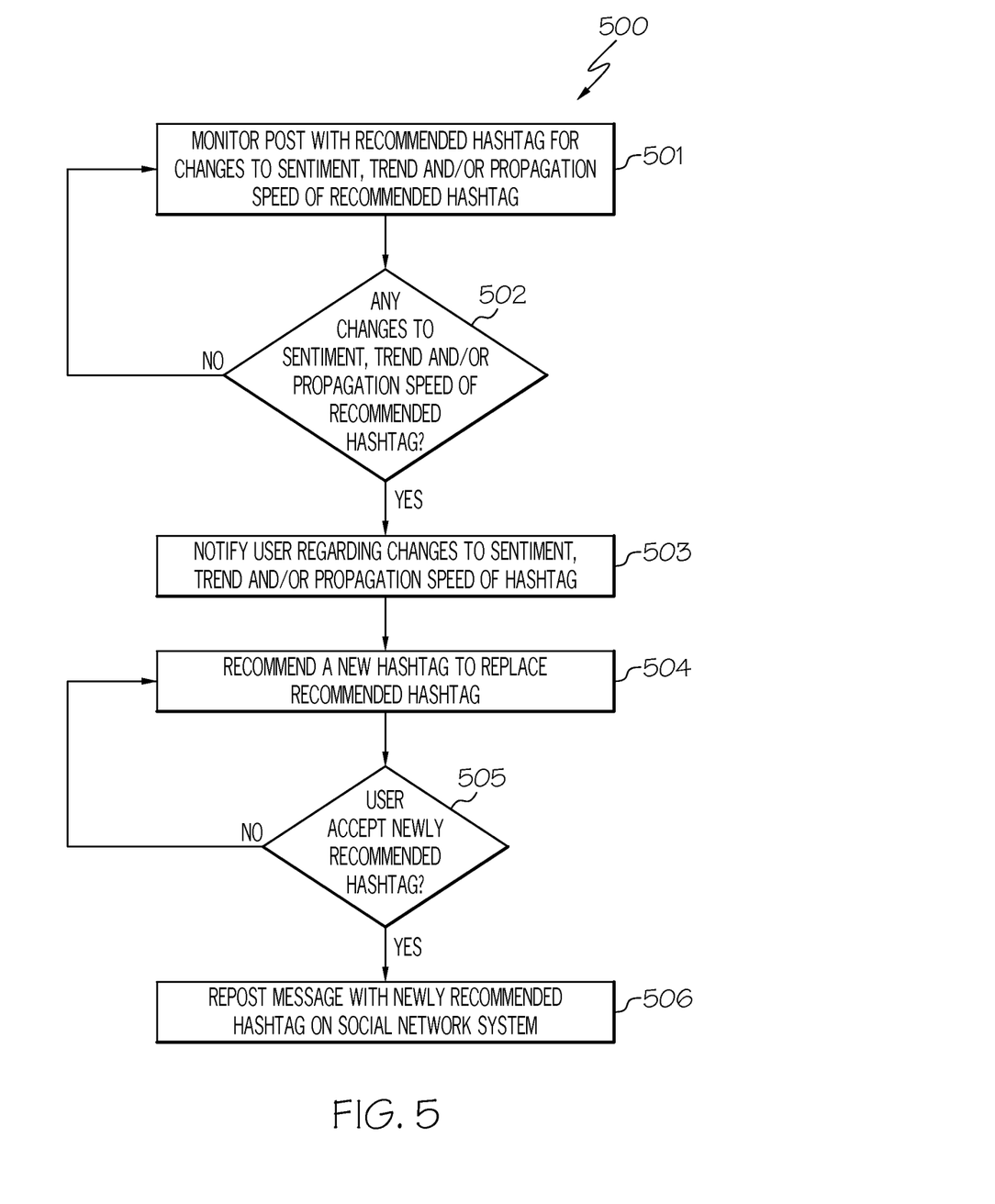
FIG. 5 is a flowchart of a method for reposting the message with a new hashtag in response to a change in the sentiment, trend and/or propagation speed of the recommended hashtag.

The principles of the present invention provide a means for selecting a hashtag that enhances the desired sentiment of a composed message as well as increase the speed of propagation for the message as discussed below in connection with FIGS. 3-5. FIG. 3 is a flowchart of a method for populating databases 111 (FIG. 1) with information used by hashtag selector 110 (FIG. 1) to select a hashtag that enhances the desired sentiment of a composed message as well as increase the speed of propagation for the message. FIG. 4 is a flowchart of a method for selecting a hashtag that enhances the desired sentiment of a composed message as well as increase the speed of propagation for the message. FIG. 5 is a flowchart of a method for reposting the message with a new hashtag in response to a change in the sentiment, trend and/or propagation speed of the recommended hashtag.

As stated above, FIG. 3 is a flowchart of a method 300 for populating databases 111 (FIG. 1) with information used by hashtag selector 110 (FIG. 1) to select a hashtag that enhances the desired sentiment of a composed message as well as increase the speed of propagation for the message in accordance with an embodiment of the present invention.

Referring to FIG. 3, in conjunction with FIGS. 1-2, in step 301, hashtag selector 110 monitors social media posts with hashtags posted in a social network environment (e.g., Facebook®). In one embodiment, hashtag selector 110 monitors for posts containing hashtags using natural language processing, where the hashtag symbol (#) is used as a keyword for identifying the hashtag in the posts.

In step 302, hashtag selector 110 identifies the topic and target audience of the monitored posts with hashtags, the sentiments of these posts, the speed of propagation of these hashtags for the identified topics and sentiments as well as the trend of the hashtags being used for the topics and sentiments of these monitored posts. "Sentiments," as used herein, refer to the attitude, manifestation or emotional feeling (e.g., positive, negative, neutral) expressed in the post. "Speed of propagation," as used herein, refers to the number of posts utilizing the hashtag over a period of time. The "trend of the hashtags," as used herein, refers to the acceleration or deceleration in utilizing the hashtag over a recent period of time.

As discussed above, the topic of the monitored posts are identified. The "topic" refers to the main subject of the post. In one embodiment, the topic of a monitored post may be identified using natural language processing, where keywords (e.g., "travel," "meeting," "birthday party") may be used to identify the topic of the post using natural language processing. In one embodiment, the target audience of the post may be determined using natural language processing, such as focusing on keywords or phrases, such as "Tom Brady," thereby deducing that the target audience is football fans since Tom Brady is a quarterback for the football team New England Patriots®.

In one embodiment, the sentiment of the message may be determined using natural language processing by focusing on keywords, such as "dislike," "disdain," and "outstanding."

In one embodiment, the propagation speed of hashtags is determined based on the number of posts utilizing the hashtag over a period of time.

In one embodiment, the trend of the hashtag is determined based on the number of times the hashtag is being utilized by users over a recent period of time.

In step 303, hashtag selector 110 stores the monitored posts (past and current posts) with a mapping of the hashtags used in the monitored posts to the identified topics and target audiences. For example, the post "#SuperBowl Way to go Tom Brady!" may be stored in database 111A along with the hashtag "#SuperBowl" mapped to the topic of "Super Bowl 49" (last Super Bowl played in which Tom Brady was a quarterback for the winning football team) and the target audience of football fans. Furthermore, in one embodiment, other information, such as the trends of the hashtags used for the topics and sentiments of these monitored posts, is stored in database 111A.

In step 304, hashtag selector 104 stores the propagation speed of the hashtags for various topics and sentiments. For example, the propagation speed of the hashtag "#SuperBowl" may be stored for the topic of "Super Bowl 49" and the target audience of football fans in database 111B.

By storing the propagation speeds for hashtags as well as a mapping of the hashtags used for various topics and sentiments for various target audiences, hashtag selector 110 is able to recommend an appropriate hashtag for the user of client device 101 to be populated in the user's composed message (e.g., e-mail message, instant message, SMS message, social media post) to advance the user's success in reaching out to as many people as possible with the composed message with a desired effect as discussed below in connection with FIG. 4.

FIG. 4 is a flowchart of a method 400 for selecting a hashtag that enhances the desired sentiment of a composed message as well as increase the speed of propagation for the message in accordance with an embodiment of the present invention.

Referring to FIG. 4, in conjunction with FIGS. 1-3, in step 401, hashtag selector 110 parses the text of a message (e.g., e-mail message, instant message, SMS message, social media post) composed by a user of client device 101 to determine the topic of interest, sentiment of the message and the target audience. For example, hashtag selector 110 is configured to parse the text of the composed message to identify keywords or phrases using natural language processing to identify the topic of interest, the sentiment of the message and the target audience as discussed above in connection with step 302.

In step 402, hashtag selector 110 evaluates the historical and current communications for the target audience (identified in step 401) who will be receiving the composed message to identify hashtags that are trending on the topic of the composed message and/or related topics to the topic of the composed message. In one embodiment, the historical and current communications for the target audience's extended network may also be used to identify hashtags that are trending on the topic of the composed message and/or related topics to the topic of the composed message. "Historical and current communications," as used herein, refer to the communications, such as social media posts, that are stored in database 111A. Such communications may be identified in database 111A based on the target audience identified in step 401 that is associated with those communications. For example, the target audience of the composed message could be fans of the baseball team Detroit Tigers®. Hence, hashtag selector 110 may evaluate historical and current communications related to fans of the baseball team Detroit Tigers® as well as their extended network, such as fans of the minor league baseball team of the Detroit Tigers®, the Toledo Mud Hens®. In one embodiment, the extended network may be identified using social media, such as identifying the friend/group affiliations or interests on the social media home pages of fans of the Detroit Tigers® baseball team.

In one embodiment, hashtags can be identified that are trending on the topic of the composed message (identified in step 401) and/or related to the topic of the composed message using the mapping of the hashtags to various topics stored in database 111A as well as using the hashtag trends stored in database 111A. For example, if the topic identified in the composed message in step 401 was the injury to Victor Martinez and the target audience identified in step 401 was fans of the Detroit Tigers® baseball team, then based on the hashtags trending on the topic (and/or related to the topic) of the injury to Victor Martinez for such a target audience, the hashtags of "#VictorMartinez," "#DetroitTigersInjury," and "#DetroitTigers" may be identified based on the mapping of hashtags of "#VictorMartinez," "#DetroitTigersInjury," and "#DetroitTigers" to various posts related to the injury to the Detroit Tigers® baseball player Victor Martinez stored in database 111A which have all been trending to be used as opposed to other hashtags (e.g., "#MartinezInjury") relating to the topic of Victor Martinez's injury.

In step 403, hashtag selector 110 evaluates the historical and current communications for the target audience (identified in step 401) who will be receiving the composed message to identify hashtags that match the desired sentiment (identified in step 401) of the composed message. In one embodiment, the historical and current communications for the target audience's extended network may also be used to identify hashtags that match the desired sentiment of the composed message. For example, hashtag selector 110 may identify the sentiment of the composed message of "Martinez tore the medial meniscus in his left knee last week during his off-season workout program. The Tigers' designated hitter will have to undergo surgery on his left knee. Let's hope the surgery will go smoothly and he will recover quickly!" as being one of concern based on keywords, such as "surgery," "hope," and "recover" using natural language processing. Hashtag selector 110 will then identify hashtags that match such a sentiment from database 111A. As discussed above, a mapping of hashtags to sentiments is stored in database 111A.

In step 404, hashtag selector 110 determines the propagation speeds of the identified hashtags (identified in steps 403 and 404), such as from database 111B. As discussed above, the propagation speeds of hashtags are stored in database 111B.

In step 405, hashtag selector 110 generates a recommended hashtag to be populated in the composed message that will increase a propagation speed of the composed message and/or emphasize the sentiment of the composed message based on the evaluations of steps 402, 403 and the propagation speeds of the hashtags determined in step 404. For instance, in connection with the example discussed above, hashtag selector 110 may recommend the hashtag of "#DetroitTigersInjury," since it is more associated with the sentiment of "concern" than the other hashtags associated with the topic of Victor Martinez's injury and has been trending positively.

In step 406, hashtag selector 110 populates the composed message with the recommended hashtag. In this manner, a hashtag may be selected for the user of the composed message that enhances the desired sentiment of a composed message as well as increase the speed of propagation for the message.

In step 407, a determination is made by hashtag selector 110 as to whether to recommend changes to the wording of the composed message to enhance the sentiment of the message using the recommended hashtag.

If there are no recommended changes to the wording of the composed message to enhance the sentiment of the message using the recommended hashtag, then, in step 408, hashtag selector 110 posts the composed message with the recommended hashtag on a social network system.

If, however, hashtag selector 110 determines to change the wording of the composed message to enhance the sentiment of the message using the recommended hashtag, then, in step 409, hashtag selector 110 modifies the composed message to enhance the sentiment of the composed message. For instance, referring to the above-example, hashtag selector 110 may recommend adding the phrase "which is concerning" after the phrase "The Tigers' designated hitter will have to undergo surgery on his left knee" to enhance the sentiment of concern which is associated with the hashtag of "#DetroitTigersInjury." Such a modification may be proposed utilizing natural language processing which identifies keywords or phrases that are being utilized in connection with the sentiment of concern that has been expressed by posts with the hashtag of "DetroitTigersInjury."

In step 410, a determination is made by hashtag selector 110 as to whether the user (e.g., user of client device 101A) accepts the proposed modification of the composed message.

If the user accepts the proposed modification of the composed message, then, in step 411, hashtag selector 110 posts the modified message with the recommended hashtag on a social network system.

If, however, the user does not accept the proposed modification of the composed message, then hashtag selector 110 posts the originally composed message with the recommended hashtag on a social network system in step 408.

Upon posting the message with the recommended hashtag, the hashtag may be monitored for any changes to the sentiment, trend and/or propagation speed associated with the hashtag as discussed below in connection with FIG. 5.

FIG. 5 is a flowchart of a method 500 for reposting the message with a new hashtag in response to a change in the sentiment, trend and/or propagation speed of the recommended hashtag in accordance with an embodiment of the present invention.

Referring to FIG. 5, in conjunction with FIGS. 1-4, in step 501, hashtag selector 110 monitors the post with the recommended hashtag for changes to the sentiment, trend and/or propagation speed of the recommended hashtag. For instance, referring to the above example, the hashtag "#DetroitTigersInjury," may change to the sentiment of hope and elation after it was reported that one of the star baseball players on the Detroit Tigers® baseball team will be returning to play sooner than expected. In one embodiment, a "change" in sentiment may be based on a percentage of posts associated with the recommended hashtag being associated with a new sentiment that exceeds a threshold percentage.

Similarly, a change in the trend of the recommended hashtag can be determined based on the deceleration of posts utilizing the recommended hashtag. If the rate at which the posts are utilizing the recommended hashtag over a period of time falls below a threshold number, then a "change" in the trend may be said to exist.

Furthermore, a change in the propagation speed of the recommended hashtag can be determined based on the number of posts utilizing the recommended hashtag over a period of time. If the number of posts utilizing the recommended hashtag over a period of time falls below a threshold number, then a "change" in the propagation speed may be said to exist.

In step 502, a determination is made by hashtag selector 110 as to whether there are any changes to the sentiment, trend and/or propagation speed of the recommended hashtag.

If there are no changes to the sentiment, trend and/or propagation speed of the recommended hashtag, then hashtag selector 110 continues to monitor the post with the recommended hashtag for changes to the sentiment, trend and/or propagation speed of the recommended hashtag in step 501.

If, however, there are changes to the sentiment, trend and/or propagation speed of the recommended hashtag, then, in step 503, hashtag selector 110 notifies the user of client device 101 (the user that composed the message) regarding the changes to the sentiment, trend and/or propagation speed of the recommended hashtag.

In step 504, hashtag selector 110 recommends a new hashtag to replace the recommended hashtag to increase the propagation speed of the message and/or emphasize the sentiment of the message. For instance, referring to the above example, hashtag selector 110 may recommend using the hashtag "#VictorMartinez" as opposed to the hashtag of "#DetroitTigersInjury," since it conveys the sentiment of concern and is used as a hashtag in connection with the topic of Victor Martinez's injury.

A determination is made in step 505 by hashtag selector 110 as to whether the user accepts the newly recommended hashtag.

If the user does not accept the newly recommended hashtag, then hashtag selector 110 recommends a different new hashtag to replace the recommended hashtag in step 504.

If, however, the user accepts the newly recommended hashtag, then, in step 506, hashtag selector 110 reposts the message with the newly recommended hashtag on a social network system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for assisting a user in selecting a desired hashtag, the method comprising:
    parsing, by a hashtag selector connected to a plurality of client devices, text of a composed message to determine a topic of interest, a sentiment and a target audience of said composed message prior to being posted on a social network system;
    evaluating, by said hashtag selector, historical and current communications for said target audience who will be receiving said composed message to identify hashtags that are trending on said topic of said composed message and related topics to said topic of said composed message;
    evaluating, by said hashtag selector, historical and current communications for said target audience who will be receiving said composed message to identify hashtags that match said sentiment of said composed message prior to posting said composed message on said social network system;
    determining, by said hashtag selector, propagation speeds of said identified hashtags;
    generating, by a processor said hashtag selector, a recommended hashtag to be populated in said composed message that will increase a propagation speed of said composed message and emphasize said sentiment of said composed message based on identifying said hashtags that are trending on said topic of said composed message and related topics to said topic of said composed message, identifying said hashtags that match said sentiment of said composed message and determining said propagating speeds of said identified hashtags; and
    populating, by said hashtag selector, said composed message with said recommended hashtag that will increase said propagation speed of said composed message and emphasize said sentiment of said composed message.

2. The method as recited in claim 1 further comprising:
    posting said composed message with said recommended hashtag on said social network system.

3. The method as recited in claim 2 further comprising:
    monitoring said post with said recommended hashtag for changes to a sentiment, a trend and a propagation speed of said recommended hashtag;
    notifying said user regarding changes to said sentiment, said trend and said propagation speed of said recommend hashtag in response to changes in said sentiment, said trend and said propagation speed of said recommended hashtag; and
    recommending a new hashtag to replace said recommended hashtag to increase said propagation speed of said composed message and emphasize said sentiment of said composed message in response to changes in said sentiment, said trend and said propagation speed of said recommended hashtag.

4. The method as recited in claim 1 further comprising:
    modifying said composed message to enhance said sentiment of said composed message with said recommended hashtag; and
    posting said modified message with said recommended hashtag on a social network system.

5. The method as recited in claim 1 further comprising:
    monitoring posts with hashtags posted in a social network environment;
    identifying topics and target audiences of said monitored posts, sentiments of said monitored posts, propagation speeds of said hashtags for said identified topics and sentiments and trends of said hashtags being used for said identified topics and sentiments of said monitored posts;
    storing said monitored posts with a mapping of hashtags used in said monitored posts to said identified topics and said target audiences along with storing said trends of said hashtags; and
    storing said propagation speeds of said hashtags for said identified topics and sentiments.

6. The method as recited in claim 1, wherein said composed message comprises one of the following: an electronic mail message, a social media post, an instant message and a short messaging service message.

7. A computer program product for assisting a user in selecting a desired hashtag, the computer program product comprising a computer readable storage medium having program code embodied therewith, the program code comprising the programming instructions for:

parsing, by a hashtag selector connected to a plurality of client devices, text of a composed message to determine a topic of interest, a sentiment and a target audience of said composed message prior to being posted on a social network system;

evaluating, by said hashtag selector, historical and current communications for said target audience who will be receiving said composed message to identify hashtags that are trending on said topic of said composed message and related topics to said topic of said composed message;

evaluating, by said hashtag selector, historical and current communications for said target audience who will be receiving said composed message to identify hashtags that match said sentiment of said composed message prior to posting said composed message on said social network system;

determining, by said hashtag selector, propagation speeds of said identified hashtags; generating, by said hashtag selector, a recommended hashtag to be populated in said composed message that will increase a propagation speed of said composed message and emphasize said sentiment of said composed message based on identifying said hashtags that are trending on said topic of said composed message and related topics to said topic of said composed message, identifying said hashtags that match said sentiment of said composed message and determining said propagating speeds of said identified hashtags; and     populating, by said hashtag selector, said composed message with said recommended hashtag that will increase said propagation speed of said composed message and emphasize said sentiment of said composed message.

8. The computer program product as recited in claim 7, wherein the program code further comprises the programming instructions for:

posting said composed message with said recommended hashtag on said social network system.

9. The computer program product as recited in claim 8, wherein the program code further comprises the programming instructions for:

monitoring said post with said recommended hashtag for changes to a sentiment, a trend and a propagation speed of said recommended hashtag;

notifying said user regarding changes to said sentiment, said trend and said propagation speed of said recommend hashtag in response to changes in said sentiment, said trend and said propagation speed of said recommended hashtag; and     recommending a new hashtag to replace said recommended hashtag to increase said propagation speed of said composed message and emphasize said sentiment of said composed message in response to changes in said sentiment, said trend and said propagation speed of said recommended hashtag.

10. The computer program product as recited in claim 7, wherein the program code further comprises the programming instructions for:

modifying said composed message to enhance said sentiment of said composed message with said recommended hashtag; and     posting said modified message with said recommended hashtag on a social network system.

11. The computer program product as recited in claim 7, wherein the program code further comprises the programming instructions for:

monitoring posts with hashtags posted in a social network environment;

identifying topics and target audiences of said monitored posts, sentiments of said monitored posts, propagation speeds of said hashtags for said identified topics and sentiments and trends of said hashtags being used for said identified topics and sentiments of said monitored posts;

storing said monitored posts with a mapping of hashtags used in said monitored posts to said identified topics and said target audiences along with storing said trends of said hashtags; and     storing said propagation speeds of said hashtags for said identified topics and sentiments.

12. The computer program product as recited in claim 7, wherein said composed message comprises one of the following: an electronic mail message, a social media post, an instant message and a short messaging service message.

13. A system hashtag selector connected to a plurality of client devices, the hashtag selector comprising:

a memory unit for storing a computer program for assisting a user in selecting a desired hashtag; and     a processor coupled to the memory unit, wherein the processor is configured to execute the program instructions of the computer program comprising:

parsing text of a composed message to determine a topic of interest, a sentiment and a target audience of said composed message prior to being posted on a social network system;

evaluating historical and current communications for said target audience who will be receiving said composed message to identify hashtags that are trending on said topic of said composed message and related topics to said topic of said composed message;

evaluating historical and current communications for said target audience who will be receiving said composed message to identify hashtags that match said sentiment of said composed message prior to posting said composed message on said social network system;

determining propagation speeds of said identified hashtags; generating a recommended hashtag to be populated in said composed message that will increase a propagation speed of said composed message and emphasize said sentiment of said composed message based on identifying said hashtags that are trending on said topic of said composed message and related topics to said topic of said composed message, identifying said hashtags that match said sentiment of said composed message and determining said propagating speeds of said identified hashtags; and     populating said composed message with said recommended hashtag that will increase said propagation speed of said composed message and emphasize said sentiment of said composed message.

14. The system as recited in claim 13, wherein the program instructions of the computer program further comprises:

posting said composed message with said recommended hashtag on said social network system.

15. The system as recited in claim 14, wherein the program instructions of the computer program further comprises:

monitoring said post with said recommended hashtag for changes to a sentiment, a trend and a propagation speed of said recommended hashtag;

notifying said user regarding changes to said sentiment, said trend and said propagation speed of said recommend hashtag in response to changes in said sentiment, said trend and said propagation speed of said recommended hashtag; and recommending a new hashtag to replace said recommended hashtag to increase said propagation speed of said composed message and emphasize said sentiment of said composed message in response to changes in said sentiment, said trend and said propagation speed of said recommended hashtag.

16. The system as recited in claim 13, wherein the program instructions of the computer program further comprises:

modifying said composed message to enhance said sentiment of said composed message with said recommended hashtag; and posting said modified message with said recommended hashtag on a social network system.

17. The system as recited in claim 13, wherein the program instructions of the computer program further comprises:

monitoring posts with hashtags posted in a social network environment;

identifying topics and target audiences of said monitored posts, sentiments of said monitored posts, propagation speeds of said hashtags for said identified topics and sentiments and trends of said hashtags being used for said identified topics and sentiments of said monitored posts;

storing said monitored posts with a mapping of hashtags used in said monitored posts to said identified topics and said target audiences along with storing said trends of said hashtags; and storing said propagation speeds of said hashtags for said identified topics and sentiments.

18. The system as recited in claim 13, wherein said composed message comprises one of the following: an electronic mail message, a social media post, an instant message and a short messaging service message.

* * * * *